(12) United States Patent
Hsieh et al.

(10) Patent No.: US 12,470,208 B2
(45) Date of Patent: Nov. 11, 2025

(54) GATING-BASED RECEIVER AND GATING SIGNAL GENERATOR

(71) Applicant: NANYA TECHNOLOGY CORPORATION, New Taipei (TW)

(72) Inventors: Po-Chun Hsieh, Taoyuan (TW); Cong-An Lu, Taoyuan (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 145 days.

(21) Appl. No.: 18/593,970

(22) Filed: Mar. 3, 2024

(65) Prior Publication Data

US 2025/0279775 A1 Sep. 4, 2025

(51) Int. Cl.
| | |
|---|---|
| *G11C 11/4096* | (2006.01) |
| *G11C 11/4076* | (2006.01) |
| *H03K 5/24* | (2006.01) |
| *H03K 17/51* | (2006.01) |
| *H03K 19/20* | (2006.01) |

(52) U.S. Cl.
CPC ............ *H03K 5/24* (2013.01); *G11C 11/4076* (2013.01); *H03K 17/51* (2013.01); *H03K 19/20* (2013.01)

(58) Field of Classification Search
CPC .......... H03K 5/24; H03K 17/51; H03K 19/20; G11C 11/4076
See application file for complete search history.

(56) References Cited

U.S. PATENT DOCUMENTS

| 8,630,131 B1* | 1/2014 | Shiao ............... H03K 19/17724 |
| | | 365/233.13 |
| 2017/0110175 A1* | 4/2017 | Kim .................... G11C 11/4093 |
| 2018/0165023 A1* | 6/2018 | Oh ........................... G06F 13/16 |
| 2021/0098039 A1* | 4/2021 | Kim ....................... G11C 7/1084 |

OTHER PUBLICATIONS

"Office Action of Taiwan Counterpart Application", issued on Dec. 18, 2024, p. 1-p. 5.

* cited by examiner

*Primary Examiner* — Min Huang
(74) *Attorney, Agent, or Firm* — JCIPRNET

(57) ABSTRACT

A gating-based receiver circuit is provided. The receiver circuit includes a gating signal generator, receiving a first and second input signals and reference voltage to output a gating signal, wherein an adaptive reference voltage is generated by the first and second input signals and the reference voltage; and a receiver, receiving the first and second input signals and the gating signal to provide a receiver output signal. In response to both the first input signal and the second input signal being higher than the adaptive reference voltage, the gating signal disables the receiver, and in response to one of the first input signal and the second input signal being lower than the adaptive reference voltage, the gating signal enables the receiver.

32 Claims, 9 Drawing Sheets

GATING-BASED RECEIVER AND GATING SIGNAL GENERATOR

BACKGROUND

Technical Field

The disclosure relates to a control method for a memory device, and particularly, to a gating-based receiver and a gating signal generator.

Description of Related Art

In a memory system compatible with the DDR5 specification, a differential data strobe signals DQS_t/DQS_c is required for data process. The data strobe signals DQS_t/DQS_c have to be transmitted to the DQS receiver of the memory system. According to the specification defined by JEDEC, the data strobe signals DQS_t/DQS_c may be in a parking period (parking mode) after and before the write operation. In this parking period, both the data strobe signals DQS_t/DQS_c are pulled up to the power voltage VDD. However, at this time, the DQS receiver is still in working, and the data strobe signals DQS_t/DQS_c will be considered as inputs with a swing of 0V. In this case, an unknown output of the DQS receiver occurs and the DQS receiver is easily subject to noise interference. The DQS receiver may make this noise interference as the input signals, and abnormality may occur in the DQS receiver.

However, the DQS receiver has to support various inputs, such as large swing data strobe signals DQS_t/DQS in FIG. 1A and small swing data strobe signals DQS_t/DQS in FIG. 1B. Therefore, inputs of strobe signals DQS_t/DQS with small swing cannot be directly filtered. For example, the noise due to the input with large swing may be a normal input with small swing, rather than noise.

Therefore, there are issues to distinguish the small swing data strobe signals DQS_t/DQS from the noise and make the DQS receiver work correctly.

SUMMARY

As described above, according to one embodiment of the disclosure, a gating-based receiver circuit is provided. The gating-based receiver circuit comprises a gating signal generator, configured to receive a first input signal, a second input signal and a first reference voltage, and to output a gating signal based on the first input signal, the second input signal and an adaptive reference voltage, wherein the adaptive reference voltage is generated by the first input signal, the second input signal and the first reference voltage, wherein the first input signal and the second input signal are tied to a power voltage; and a receiver, configured to receive the first input signal, the second input signal and the gating signal, and to provide a receiver output signal. In response to both the first input signal and the second input signal are higher than the adaptive reference voltage, the receiver is disabled.

According to another embodiment of the disclosure, a gating signal generator is provided. The gating signal generator comprises: an adaptive reference voltage generator, receiving a first input signal, a second input signal and a first reference voltage, and generating an adaptive reference voltage based on the first input signal, the second input signal and the first reference voltage; and a comparator circuit, receiving the first input signal, the second input signal and the adaptive reference voltage, and generating a gating signal. In response to both the first input signal and the second input signal are higher than the adaptive reference voltage, the gating signal generator outputs the gating signal as a disabling signal. In response to one of the first input signal and the second input signal is lower than the adaptive reference voltage, the gating signal generator outputs the gating signal as an enabling signal.

According to one embodiment of the disclosure, in the gating-based receiver circuit or the gating signal generator, the gating signal generator further comprises: an adaptive reference voltage generator, receiving the first input signal, the second input signal and the first reference voltage, and generating the adaptive reference voltage based on the first input signal, second input signal and the first reference voltage; and a comparator circuit, receiving the first input signal, the second input signal and the adaptive reference voltage, and generating the gating signal to enable or disable the receiver.

According to one embodiment of the disclosure, in the gating-based receiver circuit or the gating signal generator, the adaptive reference voltage generator further comprises: a minimum circuit, receiving the first input signal, the second input signal and the first reference voltage and outputting a minimum of the first input signal, the second input signal and the first reference voltage; a negative peak detector, configured to detect negative peaks of the minimum, and output a voltage; and a voltage divider, coupled between the power voltage and the voltage, and configured to divide the voltage to output the adaptive reference voltage.

According to one embodiment of the disclosure, in the gating-based receiver circuit or the gating signal generator, the comparator circuit further comprises: a first comparator, receiving the first input signal and the adaptive reference voltage; a second comparator, receiving the second input signal and the adaptive reference voltage; and a logic circuit, receiving an output of the first comparator and an output of the second comparator, and outputting the gating signal through a logic operation of the outputs of the first and the second comparators. According to one embodiment of the disclosure, in the gating-based receiver circuit, the logic circuit comprises an AND gate.

According to one embodiment of the disclosure, in the gating-based receiver circuit or the gating signal generator, the adaptive reference voltage generator further comprises: a first resistor, having a first end coupled to the first input signal and a second end coupled to a connection node; a second resistor, having a first end coupled to the second input signal and a second end coupled to the connection node; a minimum circuit, receiving the reference voltage and a common mode voltage at the connection node, and outputting a minimum of the common mode voltage and the first reference voltage; a negative peak detector, configured to detect negative peaks of the minimum, and output a voltage; and a voltage divider, coupled between the power voltage and the voltage, and configured to divide the voltage to output the adaptive reference voltage.

According to one embodiment of the disclosure, in the gating-based receiver circuit or the gating signal generator, the comparator circuit further comprises: a first comparator, receiving the first input signal and the adaptive reference voltage; a second comparator, receiving the second input signal and the adaptive reference voltage; and a logic circuit, receiving an output of the first comparator and an output of the second comparator, and outputting the gating signal through a logic operation of the outputs of the first and the second comparators. According to one embodiment of the disclosure, in the gating-based receiver circuit, the logic circuit comprises an AND gate.

According to one embodiment of the disclosure, in the gating-based receiver circuit or the gating signal generator, the adaptive reference voltage generator further comprises: a first resistor, having a first end coupled to the first input signal and a second end coupled to a connection node; a second resistor, having a first end coupled to the second input signal and a second end coupled to the connection node; a minimum circuit, receiving the first reference voltage and a common mode voltage at the connection node, and outputting a minimum of the common mode voltage and the first reference voltage; a negative peak detector, configured to detect negative peaks of the minimum, and output a voltage; and a first voltage divider, configured to divide the voltage to output the adaptive reference voltage; and a second voltage divider, coupled between the power voltage and the connection node and generating a second reference voltage.

According to one embodiment of the disclosure, in the gating-based receiver circuit or the gating signal generator, the adaptive reference voltage generator further comprises: a capacitor, having a first end coupled to the power voltage and a second end coupled to the connection node.

According to one embodiment of the disclosure, in the gating-based receiver circuit or the gating signal generator, the comparator circuit further comprises: a first minimum circuit, receiving the first input signal and the second input signal, and outputting a first minimum of the first input signal and the second input signal; a second minimum circuit, receiving the second reference voltage and the adaptive reference voltage, and outputting a second minimum of the second reference voltage and the second adaptive reference voltage; and a comparator, configured to compare the first minimum and the second minimum to output the gating signal.

According to one embodiment of the disclosure, in the gating-based receiver circuit or the gating signal generator, in response to both the first input signal and the second input signal are higher than the adaptive reference voltage and the second reference voltage, the gating signal is disabled, and in response to one of the first input signal and the second input signal is lower than the adaptive reference voltage and the second reference voltage, the gating signal is enabled.

According to one embodiment of the disclosure, in the gating-based receiver circuit or the gating signal generator, the adaptive reference voltage is lower than a highest voltage of the first input signal and the second input signal, and higher than a lowest voltage of the second reference voltage.

According to one embodiment of the disclosure, in the gating-based receiver circuit or the gating signal generator, the gating-based receiver circuit is a data strobe signal receiver of a memory device.

According to one embodiment of the disclosure, in the gating-based receiver circuit or the gating signal generator, the first input signal and the second input signal are a pair of differential data strobe signals.

According to one embodiment of the disclosure, in the gating-based receiver circuit or the gating signal generator, the memory device is a DRAM.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
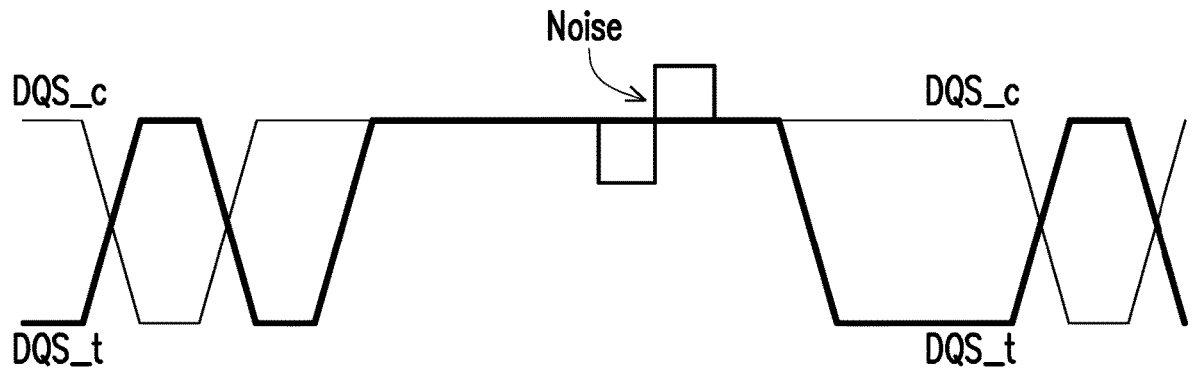
FIGS. 1A and 1B illustrates the waveforms of the differential data strobe signal with large and small swings.
Figure 1B:
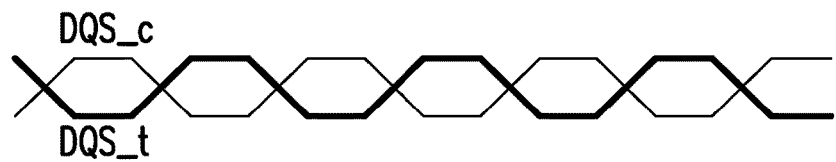
Figure 2:
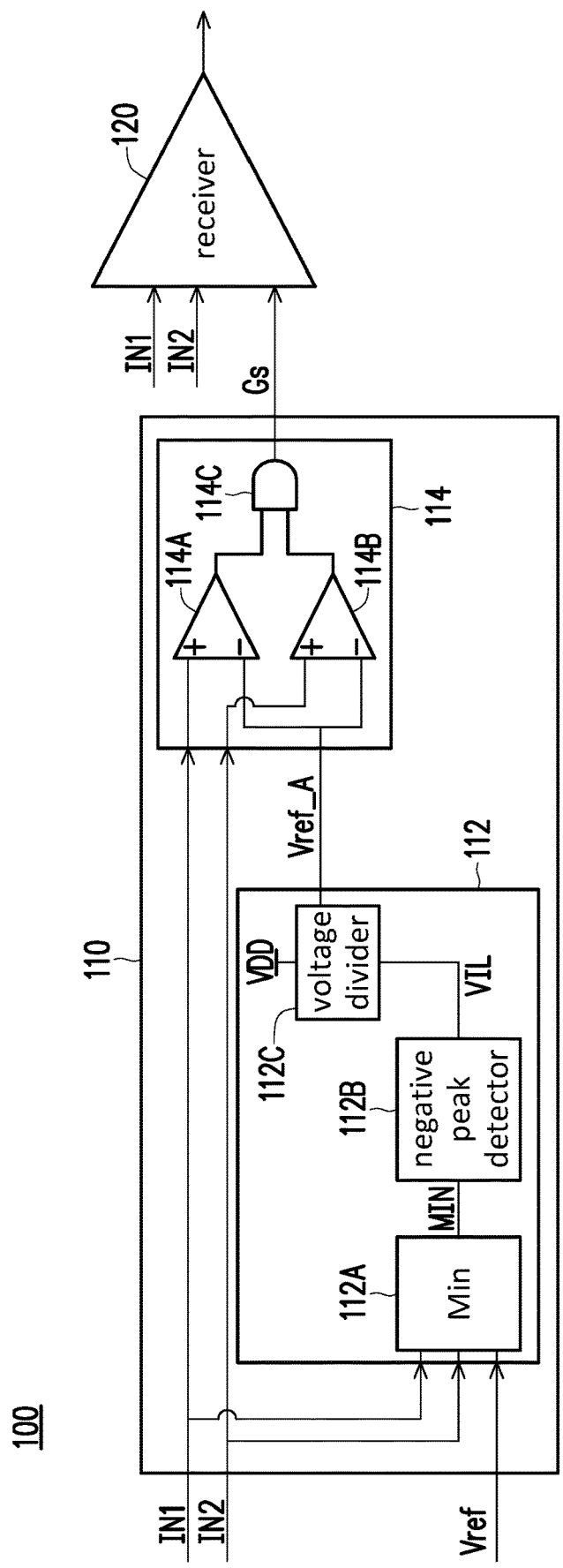
FIG. 2 illustrates a gating-based receiver circuit according to one embodiment of the present disclosure.

FIG. 2 illustrates a gating-based receiver circuit according to one embodiment of the present disclosure. In FIG. 2, the gating-based receiver circuit 100 comprises a gating signal generator 110 and a receiver 120. The gating signal generator detector 110 is configured to receive a first input signal IN1, a second input signal IN2 and a reference voltage Vref, and then accordingly to output a gating signal Gs. In addition, the receiver 120 is configured to receive the first input signal IN1, the second input signal IN2 and the gating signal, and then output an output signal OUT.

In one example, the gating-based receiver circuit 100 can be applied to a memory device, such as a DRAM. The DRAM may be compatible with DDR5 specification. When the gating-based receiver circuit 100 is applied to the DRAM with DDR5 specification, the input signal IN1 and second input signal IN2 are a pair of differential data strobe signals DQS_t and DQS_c respectively.

The gating signal generator 110 can be referred as a tie-to-VDD detector and further comprises an adaptive reference voltage generator 112 and a comparator circuit 114. The adaptive reference voltage generator 112 is configured to receive the first input signal IN1, the second input signal IN2 and a reference voltage Vref, and to output an adaptive reference voltage Vref_A. The adaptive reference voltage Vref_A is provided to the comparator circuit 114. The comparator circuit 114 is configured to receive the first input signal IN1, the second input signal IN2 and the adaptive reference voltage Vref_A, and to output the gating signal Gs. In one example, the reference voltage Vref may be an internal or an external reference voltage for initial condition. The reference voltage Vref may be used to limit a maximum value of the adaptive reference voltage Vref_A.

The adaptive reference voltage generator 112 comprises a minimum circuit 112A, a negative peak detector 112B and a voltage divider 112C. The minimum circuit 112A receives the first input signal IN1, the second input signal IN2 and the reference voltage Vref, and a minimum MIN among the first input signal IN1, the second input signal IN2 and the reference voltage Vref is output to the negative peak detector 112B.

Figure 3:
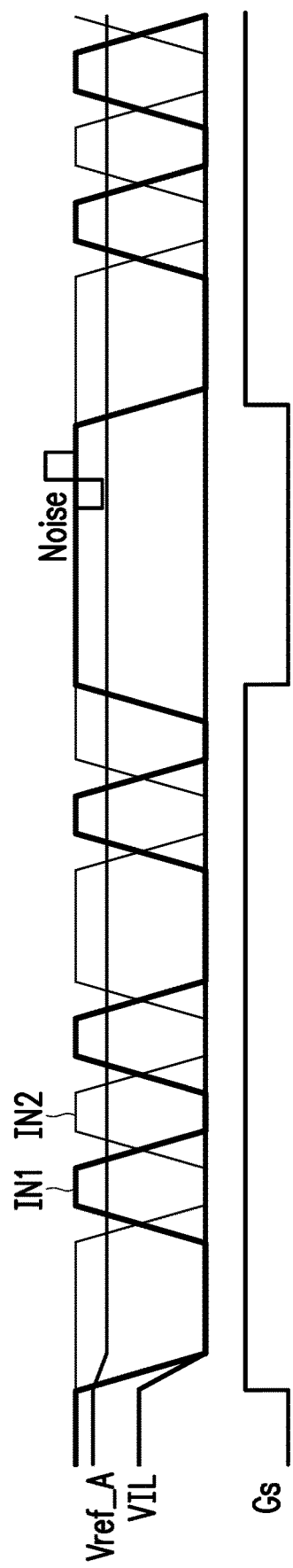
FIG. 3 illustrates a waveform diagram showing the operation of the gating-based receiver circuit with the gating signal generator of FIG. 2.

The negative peak detector 112B is configured to detect a negative peak of the minimum MIN, and output a voltage VIL. As shown in FIG. 3, initially, the first input signal IN1 and the second input signal IN2 are tied to the power voltage VDD, and then the first input signal IN1 begins to drop to the low level, and the negative peak detector 112B detects this low level of the first input signal IN1 and outputs as the voltage VIL. Then, as time laps, the first input signal IN1 begins to raise to the high level and the second input signal IN2 drop to the low level and similarly negative peak detector 112B detects this low level of the second input signal IN2 and outputs as the voltage VIL. In addition, the voltage may be set in a range from the lowest values of the first input signal IN1 and the second input signal IN2 to the ground voltage (such as 0V).

Then, the voltage VIL is provided to the voltage divider 112C. For example, the voltage divider 112C may be a configuration that a plurality of resistors is serially connected. In one example, the voltage divider 112C is connected between a power voltage VDD and the voltage VIL. The other one may use one of the connection nodes of any two of the resistors as an output node to output the adaptive reference voltage Vref_A. The adaptive reference voltage Vref_A may be set as a voltage by dividing a voltage drop between the power voltage VDD and the voltage VIL. Then, the generated adaptive reference voltage Vref_A is output to the comparator circuit 114.

The comparator circuit 114 comprises a first comparator 114A, a second comparator 114B and a logic circuit 114C. In one example, a positive input end of the first comparator 114A receives the first input signal IN1 and a negative input end of the first comparator 114A receives the adaptive reference voltage Vref_A. Similarly, a positive input end of the second comparator 114B receives the second input signal IN2 and a negative input end of the second comparator 114B receives the adaptive reference voltage Vref_A. The logic circuit 114C is configured to receive the output of the first comparator 114A and the output of the second comparator 114B, and then output the gating signal Gs through a logic operation, so that the gating signal becomes a low level when both the first input signal IN1 and the second input signal IN2 are larger than the adaptive reference voltage Vref_A. In one example, the logic circuit 114C may be implemented by an AND gate or other similar equivalent logic combinations.

When the gating signal Gs becomes the low level, the receiver 12 is disabled and the first and the second input signals IN1, IN2 received by the receiver 120 are blocked. In addition, when the gating signal Gs becomes a high level and the receiver is enabled, the first and the second input signals IN1, IN2 received by the receiver 120 pass through the receiver 120 as the receiver output signal OUT.

FIG. 3 illustrates a timing diagram showing the operation of the gating-based receiver circuit with the gating signal generator of FIG. 2. As shown, the first input signal IN1 and the second input signal IN2 are tied to VDD. The adaptive reference voltage Vref_A is dropped to a level lower than VDD when the first input signal IN1 becomes low. In this case, when one of the first input signal IN1 and the second input signal IN2 is lower than the adaptive reference voltage Vref_A, the gating signal Gs generated by the gating signal generator 110 becomes a high level. When the gating signal Gs is in the high level state, the receiver 120 is enabled and normally operated, and thus the received first input signal IN1 and the second input signal IN2 may pass through the receiver 120.

In addition, when there are noises in the first input signal IN1 and the second input signal IN2, and then if both the input signal IN1 and the second input signal IN2 are higher than the adaptive reference voltage Vref_A, the noise can be correctly filtered. In this case, the gating signal Gs generated by the gating signal generator 110 becomes the low level. When the gating signal Gs is in the low level, the receiver 120 is disabled, the operation of the receiver 120 is stopped, and thus the received first input signal IN1 and the second input signal IN2 do not pass through the receiver 120. Namely, when the gating signal generator 110 detects there are noises, the receiver does not work and the previous state will be maintained. As a result, the receiver circuit 100 may function normally without being affected by the noise and wrong operation.

Figure 4:
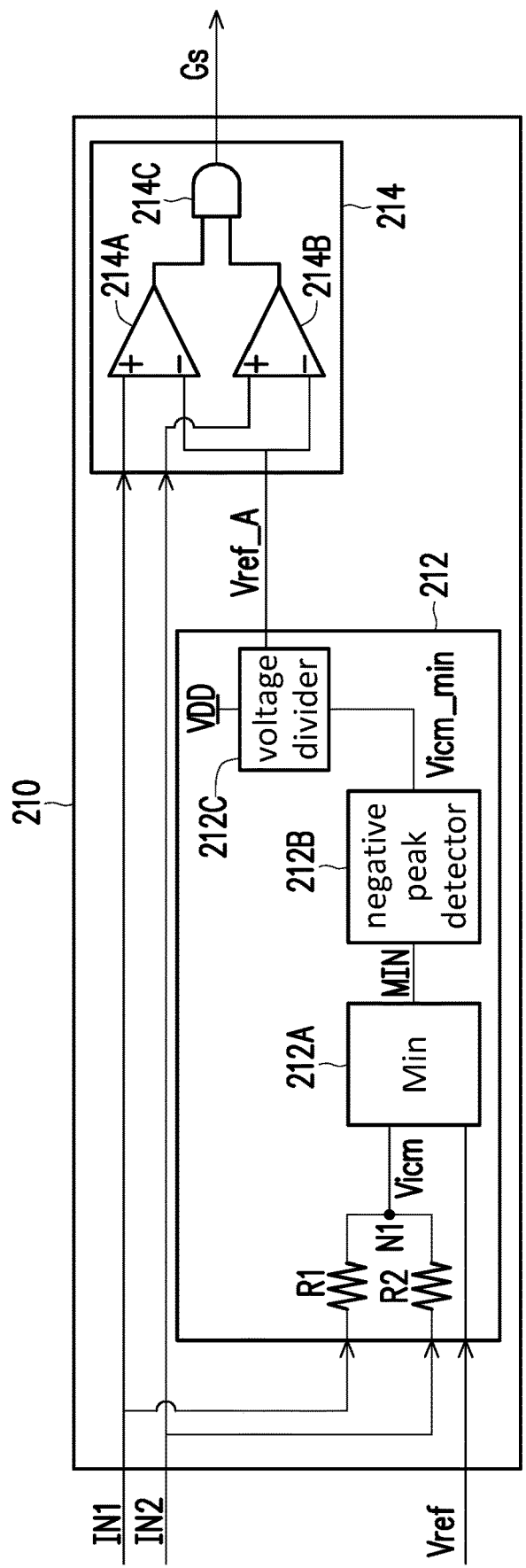
FIG. 4 illustrates a gating signal generator of the gating-based receiver circuit according to another embodiment of the present disclosure.

FIG. 4 illustrates a gating signal generator of the gating-based receiver circuit according to another embodiment of the present disclosure. The gating signal generator 210 in FIG. 4 is basically the same as the gating signal generator 110 in FIG. 3, but it is different in the adaptive reference voltage generator.

The gating signal generator 210 can be also referred as a tie-to-VDD detector and further comprises an adaptive reference voltage generator 212 and a comparator circuit 214. The adaptive reference voltage generator 212 is configured to receive the first input signal IN1, the second input signal IN2 and a reference voltage Vref, and to output an adaptive reference voltage Vref_A. The adaptive reference voltage Vref_A is provided to the comparator circuit 214. The comparator circuit 214 is configured to receive the signal IN1, the second input signal IN2 and the adaptive reference voltage Vref_A, and to output the gating signal Gs. In one example, the reference voltage Vref may be an internal or an external reference voltage for initial condition. The reference voltage Vref may be used to limit a maximum value of the adaptive reference voltage Vref_A. The comparator circuit 214 in FIG. 4 is the same as the comparator circuit 114 in FIG. 3, and thus the related description is omitted. In the followings, only the adaptive reference voltage generator 212 is described.

In FIG. 4, the adaptive reference voltage generator 212 comprises a first resistor R1, a second resistor R2, a minimum circuit 212A, a negative peak detector 212B and a voltage divider 212C. The first resistor R1 has a first end coupled to the first input signal IN1 and a second end coupled to a connection node N1. The second resistor R2 has a first end coupled to the second input signal IN2 and a second end coupled to the connection node N1. In a way, the first resistor R1 and the second resistor R2 are serially connected. In one example, the resistances of the first resistor R1 and the second resistor R2 may be the same, and the common mode voltage Vicm at the connection node N1 is half of the voltage difference between the voltage levels of the first input signal IN1 and the second input signal IN2. In another example, the resistances of the first resistor R1 and the second resistor R2 may be different from each other.

The minimum circuit 212A receives the common mode voltage Vicm and the reference voltage Vref, and a minimum MIN of the common mode voltage Vicm and the reference voltage Vref is output to the negative peak detector 212B.

The negative peak detector 212B is configured to detect a negative peak of the minimum MIN, and output a minimum common mode voltage Vicm_min. As shown in FIG. 3, initially, the first input signal IN1 and the second input signal IN2 are tied to the power voltage VDD, and then the first input signal IN1 begins to drop to the low level, and the negative peak detector 212B detects this low level of the first input signal IN1 and outputs as the minimum common mode voltage Vicm_min. Then, as time laps, the first input signal IN1 begins to raise to the high level and the second input signal IN2 drop to the low level and similarly negative peak detector 212B detects this low level of the second input signal IN2 and outputs as the minimum common mode voltage Vicm_min.

Then, the minimum common mode voltage Vicm_min is provided to the voltage divider 212C. For example, the voltage divider 212C may be a configuration that a plurality of resistors is serially connected. In one example, the voltage divider 212C is connected between a power voltage VDD and the minimum common mode voltage Vicm_min. One may use one of the connection nodes of any two of the resistors as an output node to output the adaptive reference voltage Vref_A. The adaptive reference voltage Vref_A may be set as a voltage by dividing a voltage drop between the power voltage VDD and the minimum common mode voltage Vicm_min. Then, the generated adaptive reference voltage Vref_A is output to the comparator circuit 214. The operation of the comparator circuit 214 may be referred to the comparator circuit 114 in FIG. 2. The comparator circuit 214 output the gating signal Gs that is further provided to the receiver 120.

The waveform diagram corresponding to the operation of the gating-based receiver circuit with the gating signal generator of FIG. 4 may be referred to FIG. 3, but the voltage VIL is replaced by the minimum common mode voltage Vicm_min. Basically, the operations of the gating signal generators of FIG. 2 and FIG. 4 are the same.

Figure 5:
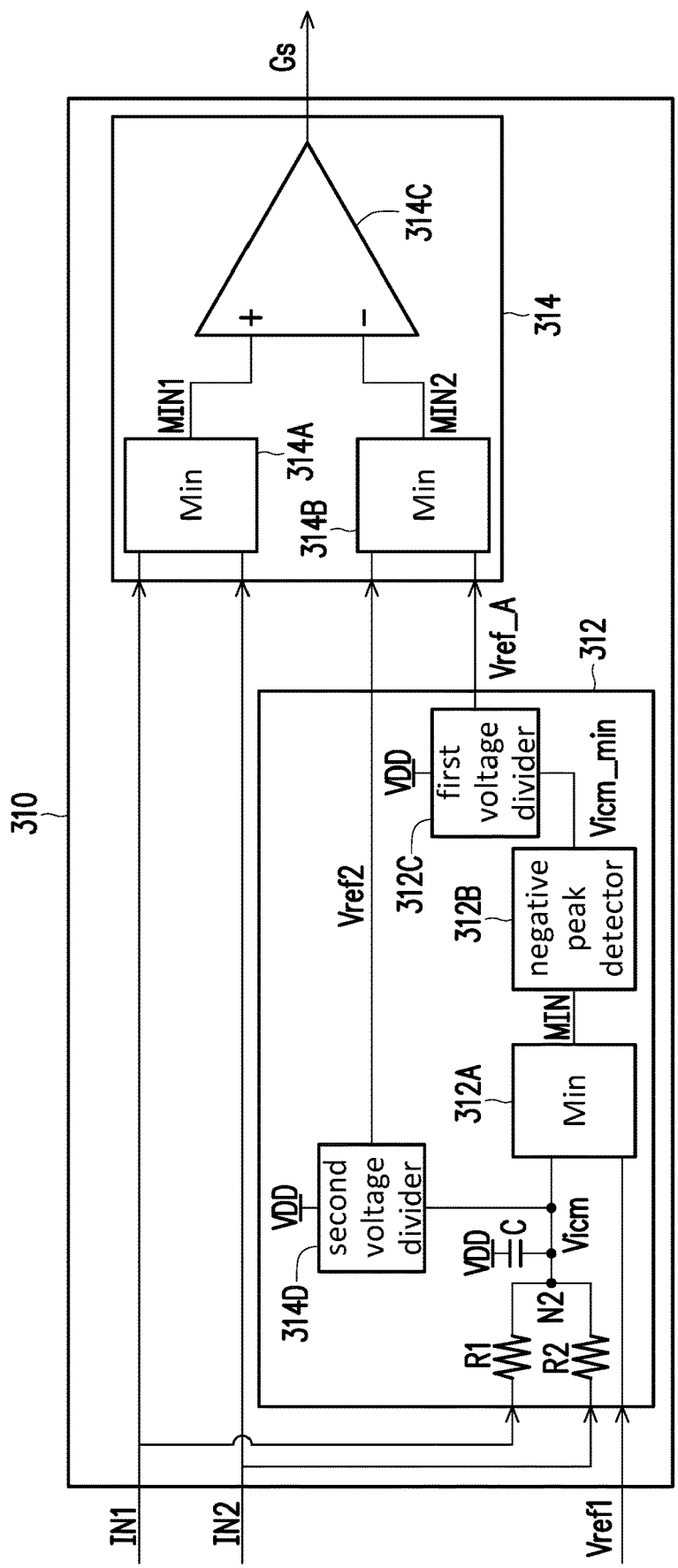
FIG. 5 illustrates a gating signal generator of the gating-based receiver circuit according to another embodiment of the present disclosure.

FIG. 5 illustrates a gating signal generator of the gating-based receiver circuit according to another embodiment of the present disclosure. The gating signal generator 310 can be also referred as a tie-to-VDD detector and further comprises an adaptive reference voltage generator 312 and a comparator circuit 314. The adaptive reference voltage generator 312 is configured to receive the first input signal IN1, the second input signal IN2 and a reference voltage (first reference voltage) Vref1, and to output an adaptive reference voltage Vref_A. The adaptive reference voltage Vref_A is provided to the comparator circuit 314. The comparator circuit 314 is configured to receive the first input signal IN1, the second input signal IN2, the adaptive reference voltage Vref_A and the active reference voltage (second reference voltage) Vref2, and to output the gating signal Gs. In one example, the reference voltage Vref1 may be an internal or an external reference voltage for initial condition of the memory device. The reference voltage Vref1 may be used to limit a maximum value of the adaptive reference voltage Vref_A.

The adaptive reference voltage generator 312 comprises a first resistor R1, a second resistor R2, a minimum circuit 312A, a negative peak detector 312B and a first voltage divider 312C, a second voltage divider 314D, and a capacitor C. The first resistor R1 has a first end coupled to the first input signal IN1 and a second end coupled to a connection node N2. The second resistor R2 has a first end coupled to the second input signal IN2 and a second end coupled to the connection node N2. In a way, the first resistor R1 and the second resistor R2 are serially connected. In one example, the resistances of the first resistor R1 and the second resistor R2 may be the same, and the common mode voltage Vicm at the connection node N2 is half of the voltage difference between the voltage levels of the first input signal IN1 and the second input signal IN2. In another example, the resistances of the first resistor R1 and the second resistor R2 may be different from each other.

The minimum circuit 312A receives the common mode voltage Vicm at the connection node N2 and the first reference voltage Vref1, and a minimum MIN of the common mode voltage Vicm and the first reference voltage Vref1 is output to the negative peak detector 312B.

The negative peak detector 312B is configured to detect a negative peak of the minimum MIN, and output the minimum common mode voltage Vicm_min. As shown in FIG. 6, initially, the first input signal IN1 and the second input signal IN2 are tied to the power voltage VDD, and then the first input signal IN1 begins to drop to the low level, and the negative peak detector 312B detects this low level of the first input signal IN1 and outputs as the minimum common mode voltage Vicm_min. Then, as time laps, the first input signal IN1 begins to raise to the high level and the second input signal IN2 drop to the low level and similarly negative peak detector 312B detects this low level of the second input signal IN2 and outputs as the minimum common mode voltage Vicm_min.

Then, the minimum common mode voltage Vicm_min is provided to the first voltage divider 312C. For example, the first voltage divider 312C may be a configuration that a plurality of resistors is serially connected. One of the connection nodes of any two of the resistors may be used as an output node to output the adaptive reference voltage Vref_A. The adaptive reference voltage Vref_A may be set as a voltage by dividing a voltage drop between the power voltage VDD and the minimum common mode voltage Vicm_min. Then, the generated adaptive reference voltage Vref_A is output to the comparator circuit 314.

The second voltage divider 314D is connected between the power voltage VDD and the connection node N2, and is operated to output a second reference voltage Vref2. The second reference voltage Vref2 is an active reference voltage. Similar to the first voltage divider 312C, the first voltage divider 312C may be a configuration that a plurality of resistors is serially connected. One may use one of the connection nodes of any two of the resistors as an output node to output the second reference voltage Vref2. The second reference voltage Vref2 may be set as a voltage by dividing a voltage drop between the power voltage VDD and the common mode voltage Vicm. Then, the generated active reference voltage Vref2 is output to the comparator circuit 314.

Furthermore, in general, a voltage range of the active reference voltage Vref2 is set to be close to an intermediate value of the first input signal IN1 and the second input signal IN2. The adaptive reference voltage Vref_A is lower than a highest voltage of the first input signal IN1 and the second input signal IN2 (in the parking mode), and higher than a lowest voltage of the active reference voltage Vref2. In addition, the minimum common mode voltage Vicm_min may be the lowest value of the adaptive reference voltage Vref_A. In one example, the common mode voltage Vicm may be set within a range from the lowest voltage of the active reference voltage Vref2 to the highest voltage of the first input signal IN1 and the second input signal IN2 (in the parking mode). In another example, the common mode voltage Vicm may be set within a range from 0.5*VDD to VDD. These voltage range may be selected or set according to the requirements.

The capacitor C has a first end coupled to the power voltage VDD and a second end coupled to the connection node N2. The capacitor C is provided at the connection node N2; namely, the second end of the capacitor C is coupled to the common mode voltage Vicm. Due to this capacitor C, the timing of generating the active reference voltage Vref2 may be delayed. The effect of the capacitor will be described with reference to FIGS. 6A to 6C.

Figure 6A:
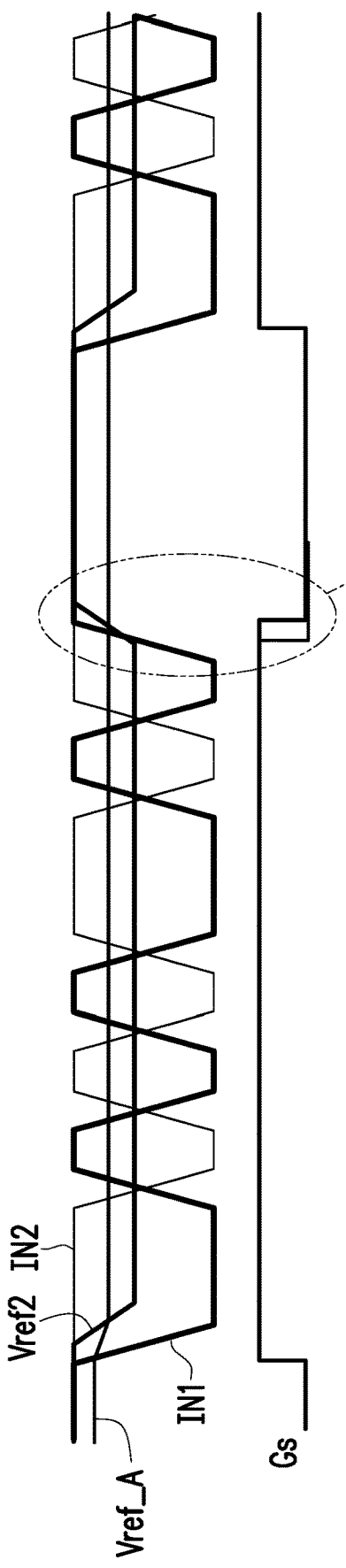
FIGS. 6A to 6C illustrates a waveform diagram to explain the effect of the capacitor of the adaptive reference voltage generator in FIG. 5.
Figure 6C:
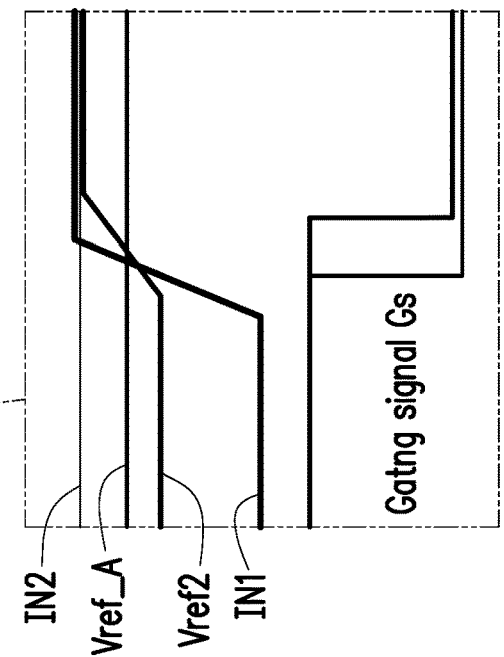
Figure 6B:
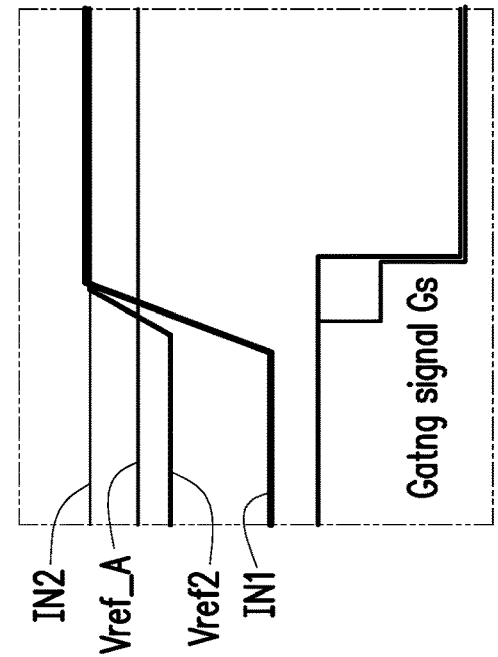

FIG. 6A illustrates a timing diagram showing the operation of the gating-based receiver circuit with the gating signal generator of FIG. 5. FIG. 6B depicts an enlarged portion of FIG. 6A that illustrates the adaptive reference voltage generator 310 is configured without the capacitor, and FIG. 6C depicts an enlarged portion of FIG. 6A illustrates the adaptive reference voltage generator 310 is configured with the capacitor. As shown in FIG. 6B, in the case that the capacitor C in FIG. 5 is not provided at the connection node N2, the transition of the active reference voltage Vref2 is not delayed. Therefore, the transition of the active reference voltage Vref2 is completely consistent with the transition of the first input signal IN1 and the second reference signal IN2. As a result, the low level state of the gating signal Gs cannot be asserted early. In addition, in the case that the capacitor C in FIG. 5 is provided at the connection node N2, the transition of the active reference voltage Vref2 is delayed. Therefore, the transition of the active reference voltage Vref2 is separated from the transition of the first input signal IN1 and the second reference signal IN2. As a result, the low level state of the gating signal Gs can be asserted early.

The comparator circuit 314 comprises a first minimum circuit 314A, a second minimum circuit 314B and a comparator 314C. The first minimum circuit 314A is configured to receive the first input signal IN1 and the second input signal IN2, and output a first minimum MIN1 of the first input signal IN1 and the second input signal IN2. In addition, the second minimum circuit 314B is configured to receive the adaptive reference voltage Vref_A and the active reference voltage Vref2, and output a second minimum MIN2 of adaptive reference voltage Vref_A and the active reference voltage Vref2.

The comparator 314C is configured to receive the first minimum MIN1 and the second minimum MIN2, and then to output the gating signal Gs based on a comparison result. The gating signal Gs is further provided to the receiver 120. As shown in FIGS. 6, when the gating signal Gs becomes the low level, the receiver 120 is disabled, so that the first and the second input signals IN1, IN2 received by the receiver 120 are blocked. In addition, when the gating signal Gs becomes the high level, the receiver is enabled, so that the first and the second input signals IN1, IN2 received by the receiver 120 pass through the receiver 120 as the receiver output signal OUT.

Figure 7:
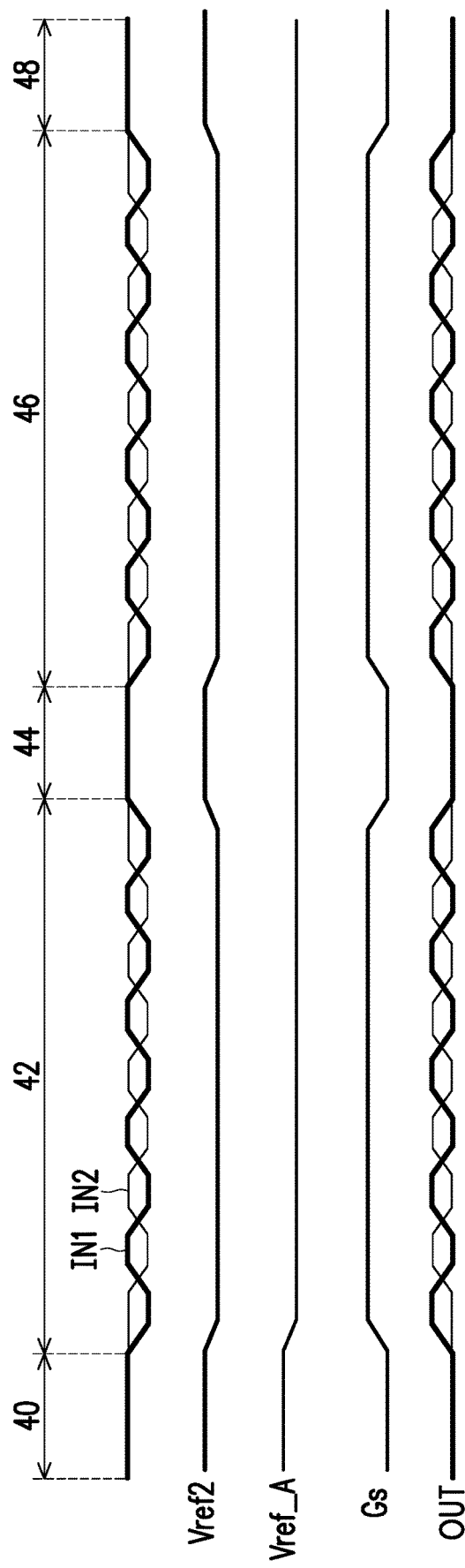
FIGS. 7 and 8 illustrate a timing diagram of the operation of the gating-based receiver circuit with gating signal generator of FIG. 5.

FIG. 7 illustrates a timing diagram of the operation of the gating-based receiver circuit with gating signal generator of FIG. 5 during performing the memory operation between controller and memory without glitch (noise) during the VDD state (both IN1 and IN2 are tied to VDD period). The timing diagram depicts a first initial VDD state 40, a first toggling region 42 including 4 cycle toggles, a second middle VDD state 44, a second toggling region 46 including 4 cycle toggles, and a final VDD state 48.

The first input signal IN1 and the second input signal IN2 (such as DQS_t and DQS_c) are tied to the power voltage VDD during the first initial VDD state 40. When the voltage levels of the first input signal IN1 and the second input signal IN2 are higher than the voltage of the adaptive reference Vref_A and the active reference Vref2, the gating signal Gs becomes the low level. Then, the receiver 120 is disabled.

In addition, when the first input signal IN1 is tied to the power voltage VDD and the second input signal IN2 is a toggle signal, the voltage level of the second input signal IN2 is lower than the adaptive reference voltage Vref_A and the active reference voltage Vref2, the gating signal becomes the high level. When the gating signal Gs becomes the high level, the receiver 120 is enabled and then the first input signal IN1 and the second input signal IN2 received by the receiver 120 is transmitted to outside as a receiver output OUT.

Figure 8:
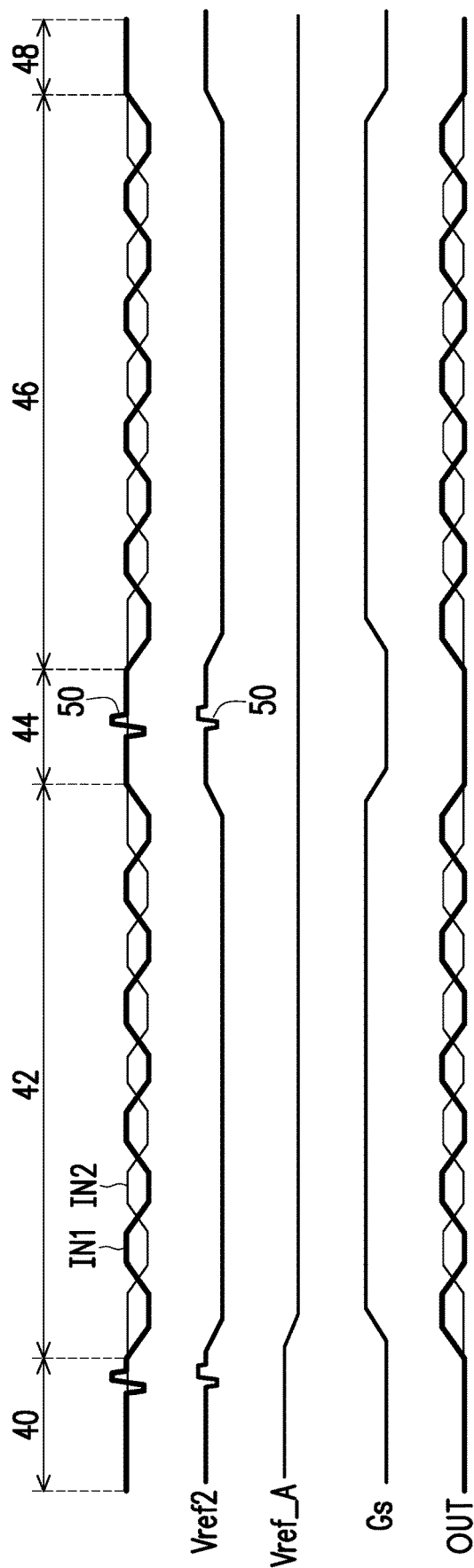

FIG. 8 illustrates a timing diagram of the operation of the gating-based receiver circuit with gating signal generator of FIG. 5 during performing the memory operation between controller and memory with glitch (noise) during the VDD state. The first input signal IN1 and the second input signal IN2 (such as DQS_t and DQS_c) are tied to the power voltage VDD with glitch (noise) 50 during the first initial VDD state 40.

When the voltage level of the first input signal IN1 and the second input signal IN2 are higher than the adaptive reference voltage Vref_A and the active reference voltage Vref2, the gating signal Gs becomes the low level. The receiver 120 is disabled, and the glitch 50 is only transmitted to the active reference voltage Vref2. In addition, when the first input signal IN1 is tied to the power voltage VDD and the active input signal IN2 is a toggle signal, the voltage level of the second input signal IN2 is lower than the adaptive reference voltage Vref_A and the active reference voltage Vref2, the gating signal becomes the high level to enable the receiver 120. When the receiver 120 is enabled by the gating signal Gs, the first input signal IN1 and the second input signal IN2 received by the receiver 120 is transmitted to outside as a receiver output OUT.

Figure 9:
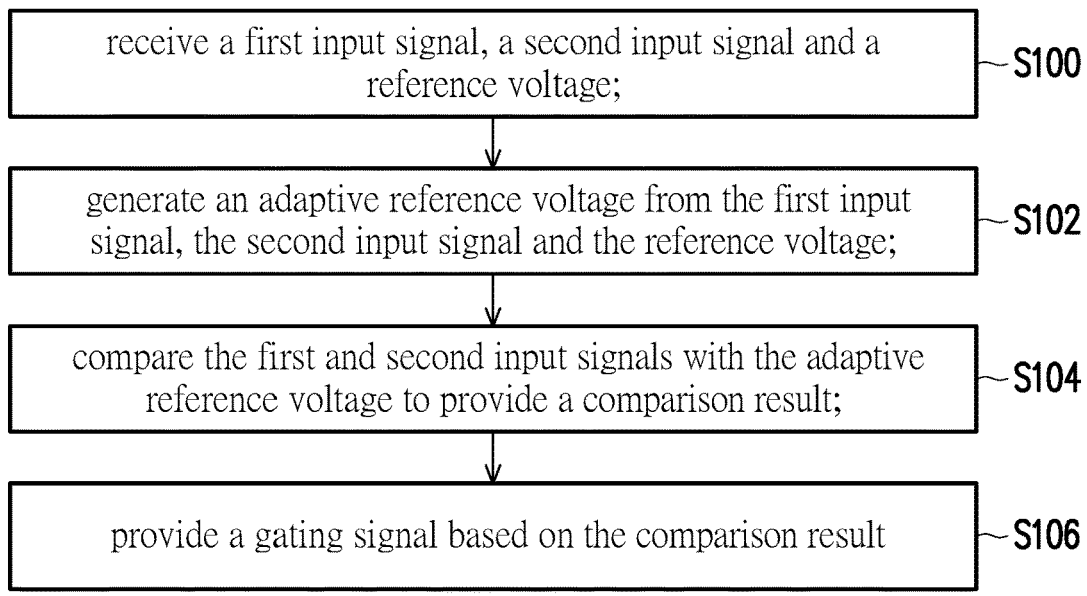
FIG. 9 is a flow chart illustrating a method for receiving data strobe signals in a memory device according to one embodiment of the disclosure.

FIG. 9 is a flow chart illustrating a method for receiving data strobe signals in a memory device according to one embodiment of the disclosure. This flow chart is implemented with exemplary hardware configurations illustrated in FIG. 2 or FIG. 4.

In step S100, a first input signal IN1, a second input signal IN2 and a reference voltage Vref are received by the gating signal generator 110 or 210. The first input signal IN1 and the second input signal IN2 may be a pair of differential data strobe signals used in a memory device (such as a DRAM memory device).

In step S102, an adaptive reference voltage Vref_A is generated from the first input signal IN1, the second input signal IN2 and the reference voltage Vref. In one example, the adaptive reference voltage Vref_A may be generated through the operation of the minimum circuit 112A (212A), the negative peak detector 112B (212B) and the voltage divider 112C (212C).

In Step S104, the first input signal IN1 and the second input signal IN2 are compared with the adaptive reference voltage Vref_A to provide a comparison result. Then, in Step S106, a gating signal Gs is generated and provided to the receiver 120 based on the comparison result.

In this case, in response to both the first input signal IN1 and the second input signal IN2 are higher than the adaptive reference voltage Vref_A, the gating signal Gs becomes the low level. Then, the receiver 120 is disabled and stops work, and the first input signal IN1 and the second input signal IN2 received by the receiver 120 are not output from the receiver 120. In addition, in response to one of the first input signal IN1 and the second input signal IN2 is lower than the adaptive reference voltage Vref_A, the gating signal Gs becomes the high level. Then, the receiver 120 is enabled to work, and the first input signal IN1 and the second input signal IN2 received by the receiver 120 are output from the receiver 120.

Figure 10:
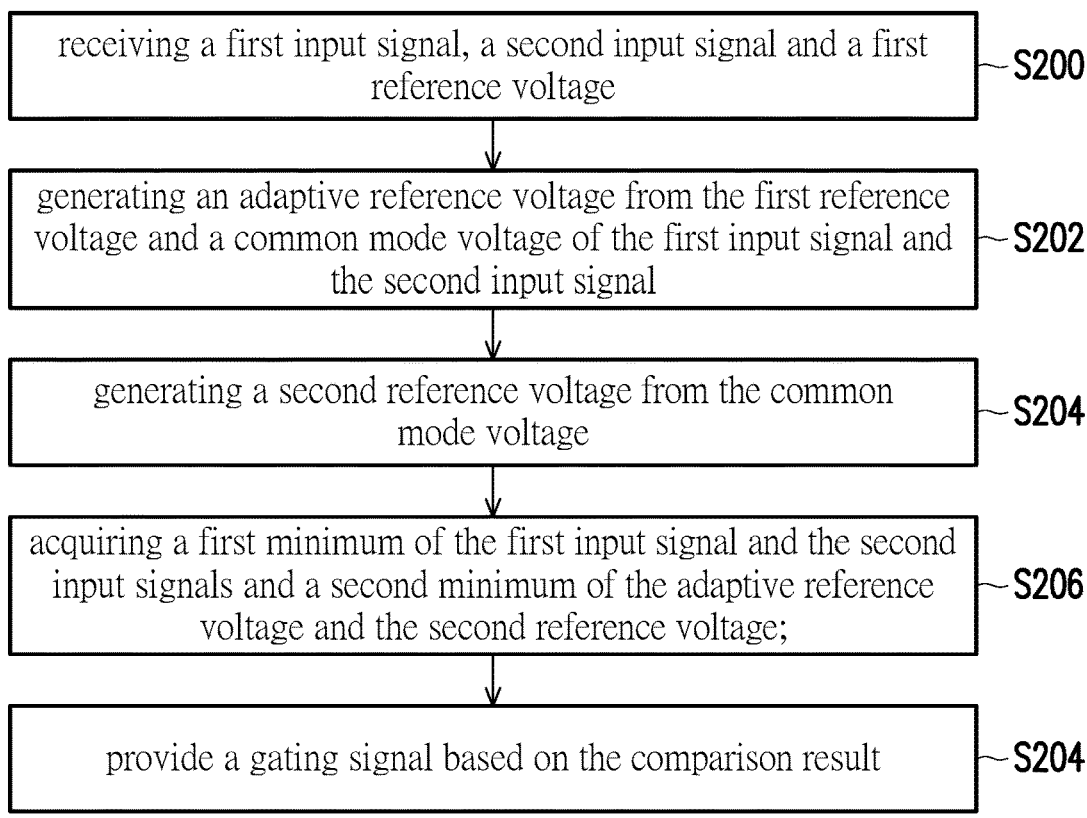
FIG. 10 is a flow chart illustrating a method for receiving data strobe signals in a memory device according to another embodiment of the disclosure.

FIG. 10 is a flow chart illustrating a method for receiving data strobe signals in a memory device according to one embodiment of the disclosure. This flow chart is implemented with exemplary hardware configurations illustrated in FIG. 5.

In step S200, a first input signal IN1, a second input signal IN2 and a first reference voltage Vref1 are received by the gating signal generator 310. The first input signal IN1 and the second input signal IN2 may be a pair of differential data strobe signals used in a memory device (such as a DRAM memory device).

In step S202, an adaptive reference voltage Vref_A is generated from the first reference voltage Vref1 and a common mode voltage Vicm of the first input signal IN1 and the second input signal IN2. In one example, the adaptive reference voltage Vref_A may be generated through the operation of the minimum circuit 312A, the negative peak detector 312B and the first voltage divider 312C.

In Step S204, an active reference voltage Vref2 is generated from the common mode voltage Vicm. For example, the active reference voltage Vref2 can be obtained by the second voltage divider 314D.

In Step S206, a first minimum MIN1 of the first input signal IN1 and the second input signal IN2 is acquired by the first minimum circuit 314A. In addition, a second minimum MIN2 of the adaptive reference voltage Vref_A and the active reference voltage Vref2 is acquired by the second minimum circuit 314B.

In Step S208, the first minimum MIN1 is compared with the second minimum MIN2 to provide a comparison result. Then, In Step S208, a gating signal Gs is generated based on the comparison result and provided to the receiver 120.

In this case, in response to both the first input signal IN1 and the second input signal IN2 are higher than the adaptive reference voltage Vref_A and the active reference voltage Vref2, the gating signal Gs becomes the low level. Then, the receiver 120 is disabled and stops work, and the first input signal IN1 and the second input signal IN2 received by the receiver 120 are not output from the receiver 120. In addition, in response to one of the first input signal IN1 and the second input signal IN2 is lower than the adaptive reference voltage Vref_A and the active reference voltage Vref2, the gating signal Gs becomes the high level. Then, the receiver 120 is enabled to work, and the first input signal IN1 and the second input signal IN2 received by the receiver 120 are output from the receiver 120.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A gating-based receiver circuit, comprising:
    a gating signal generator, configured to receive a first input signal, a second input signal and a first reference voltage, and to output a gating signal based on the first input signal, the second input signal and an adaptive reference voltage, wherein the adaptive reference voltage is generated by the first input signal, the second input signal and the first reference voltage, wherein the first input signal and the second input signal are tied to a power voltage; and
    a receiver, configured to receive the first input signal, the second input signal and the gating signal, and to provide a receiver output signal according to the gating signal,
    wherein in response to both the first input signal and the second input signal are higher than the adaptive reference voltage, the receiver is disabled by the gating signal.

2. The gating-based receiver circuit according to claim 1, wherein the gating signal generator further comprises:
    an adaptive reference voltage generator, receiving the first input signal, the second input signal and the first reference voltage, and generating the adaptive reference voltage based on the first input signal, the second input signal and the first reference voltage; and
    a comparator circuit, receiving the first input signal, the second input signal and the adaptive reference voltage, and generating the gating signal to enable or disable the receiver.

3. The gating-based receiver circuit according to claim 2, wherein the adaptive reference voltage generator further comprises:
    a minimum circuit, receiving the first input signal, the second input signal and the first reference voltage and outputting a minimum of the first input signal, the second input signal and the first reference voltage;
    a negative peak detector, configured to detect negative peaks of the minimum, and output a voltage; and
    a voltage divider, coupled between the power voltage and the voltage, and configured to divide the voltage to output the adaptive reference voltage.

4. The gating-based receiver circuit according to claim 3, wherein the comparator circuit further comprises:
    a first comparator, receiving the first input signal and the adaptive reference voltage;
    a second comparator, receiving the second input signal and the adaptive reference voltage; and
    a logic circuit, receiving an output of the first comparator and an output of the second comparator, and outputting the gating signal through a logic operation of the outputs of the first and the second comparators.

5. The gating-based receiver circuit according to claim 4, wherein the logic circuit comprises an AND gate.

6. The gating-based receiver circuit according to claim 2, wherein the adaptive reference voltage generator further comprises:
    a first resistor, having a first end coupled to the first input signal and a second end coupled to a connection node;
    a second resistor, having a first end coupled to the second input signal and a second end coupled to the connection node;
    a minimum circuit, receiving the reference voltage and a common mode voltage at the connection node, and outputting a minimum of the common mode voltage and the first reference voltage;
    a negative peak detector, configured to detect negative peaks of the minimum, and output a voltage; and
    a voltage divider, coupled between the power voltage and the voltage, and configured to divide the voltage to output the adaptive reference voltage.

7. The gating-based receiver circuit according to claim 6, wherein the comparator circuit further comprises:
    a first comparator, receiving the first input signal and the adaptive reference voltage;

a second comparator, receiving the second input signal and the adaptive reference voltage; and a logic circuit, receiving an output of the first comparator and an output of the second comparator, and outputting the gating signal through a logic operation of the outputs of the first and the second comparators.

8. The gating-based receiver circuit according to claim 7, wherein the logic circuit comprises an AND gate.

9. The gating-based receiver circuit according to claim 2, wherein the adaptive reference voltage generator further comprises:

a first resistor, having a first end coupled to the first input signal and a second end coupled to a connection node;

a second resistor, having a first end coupled to the second input signal and a second end coupled to the connection node;

a minimum circuit, receiving the first reference voltage and a common mode voltage at the connection node, and outputting a minimum of the common mode voltage and the first reference voltage;

a negative peak detector, configured to detect negative peaks of the minimum, and output a voltage; and a first voltage divider, configured to divide the voltage to output the adaptive reference voltage; and a second voltage divider, coupled between the power voltage and the connection node and generating a second reference voltage.

10. The gating-based receiver circuit according to claim 9, wherein the adaptive reference voltage generator further comprises:

a capacitor, having a first end coupled to the power voltage and a second end coupled to the connection node.

11. The gating-based receiver circuit according to claim 9, wherein the comparator circuit further comprises:

a first minimum circuit, receiving the first input signal and the second input signal, and outputting a first minimum of the first input signal and the second input signal;

a second minimum circuit, receiving the second reference voltage and the adaptive reference voltage, and outputting a second minimum of the second reference voltage and the second adaptive reference voltage; and a comparator, configured to compare the first minimum and the second minimum to output the gating signal.

12. The gating-based receiver circuit according to claim 11, wherein in response to both the first input signal and the second input signal are higher than the adaptive reference voltage and the second reference voltage, the gating signal is to disable the receiver.

13. The gating-based receiver circuit according to claim 9, wherein the adaptive reference voltage is lower than a highest voltage of the first input signal and the second input signal, and higher than a lowest voltage of the second reference voltage.

14. The gating-based receiver circuit according to claim 1, wherein the gating-based receiver circuit is a data strobe signal receiver of a memory device.

15. The gating-based receiver circuit according to claim 14, wherein the first input signal and the second input signal are a pair of differential data strobe signals.

16. The gating-based receiver circuit according to claim 14, wherein the memory device is a DRAM.

17. A gating signal generator, comprising:

an adaptive reference voltage generator, receiving a first input signal, a second input signal and a first reference voltage, and generating an adaptive reference voltage based on the first input signal, the second input signal and the first reference voltage; and a comparator circuit, receiving the first input signal, the second input signal and the adaptive reference voltage, and generating a gating signal, wherein in response to both the first input signal and the second input signal are higher than the adaptive reference voltage, the gating signal generator outputs the gating signal as a disabling signal, and in response to one of the first input signal and the second input signal is lower than the adaptive reference voltage, the gating signal generator outputs the gating signal as an enabling signal.

18. The gating signal generator according to claim 17, wherein the gating signal generator further comprises:

an adaptive reference voltage generator, receiving the first input signal, the second input signal and the first reference voltage, and generating the adaptive reference voltage based on the first input signal, the second input signal and the first reference voltage; and a comparator circuit, receiving the first input signal, the second input signal and the adaptive reference voltage, and generating the gating signal.

19. The gating signal generator according to claim 18, wherein the adaptive reference voltage generator further comprises:

a minimum circuit, receiving the first input signal, the second input signal and the first reference voltage and outputting a minimum of the first input signal, the second input signal and the first reference voltage;

a negative peak detector, configured to detect negative peaks of the minimum, and output a voltage; and a voltage divider, coupled between the power voltage and the voltage, and configured to divide the voltage to output the adaptive reference voltage.

20. The gating signal generator according to claim 19, wherein the comparator circuit further comprises:

a first comparator, receiving the first input signal and the adaptive reference voltage;

a second comparator, receiving the second input signal and the adaptive reference voltage; and a logic circuit, receiving an output of the first comparator and an output of the second comparator, and outputting the gating signal through a logic operation of the outputs of the first and the second comparators.

21. The gating signal generator according to claim 20, wherein the logic circuit comprises an AND gate.

22. The gating signal generator according to claim 18, wherein the adaptive reference voltage generator further comprises:

a first resistor, having a first end coupled to the first input signal and a second end coupled to a connection node;

a second resistor, having a first end coupled to the second input signal and a second end coupled to the connection node;

a minimum circuit, receiving the reference voltage and a common mode voltage at the connection node, and outputting a minimum of the common mode voltage and the first reference voltage;

a negative peak detector, configured to detect negative peaks of the minimum, and output a voltage; and a voltage divider, coupled between the power voltage and the voltage, and configured to divide the voltage to output the adaptive reference voltage.

23. The gating signal generator according to claim 22, wherein the comparator circuit further comprises:

a first comparator, receiving the first input signal and the adaptive reference voltage;

a second comparator, receiving the second input signal and the adaptive reference voltage; and a logic circuit, receiving an output of the first comparator and an output of the second comparator, and outputting the gating signal through a logic operation of the outputs of the first and the second comparators.

24. The gating signal generator according to claim 22, wherein the logic circuit comprises an AND gate.

25. The gating signal generator according to claim 18, wherein the adaptive reference voltage generator further comprises:
- a first resistor, having a first end coupled to the first input signal and a second end coupled to a connection node;
- a second resistor, having a first end coupled to the second input signal and a second end coupled to the connection node;
- a minimum circuit, receiving the first reference voltage and a common mode voltage at the connection node, and outputting a minimum of the common mode voltage and the first reference voltage;
- a negative peak detector, configured to detect negative peaks of the minimum, and output a voltage; and
- a first voltage divider, configured to divide the voltage to output the adaptive reference voltage; and
- a second voltage divider, coupled between the power voltage and the connection node and generating a second reference voltage.

26. The gating signal generator according to claim 25, wherein the adaptive reference voltage generator further comprises:
- a capacitor, having a first end coupled to the power voltage and a second end coupled to the connection node.

27. The gating signal generator according to claim 25, wherein the comparator circuit further comprises:
- a first minimum circuit, receiving the first input signal and the second input signal, and outputting a first minimum of the first input signal and the second input signal;
- a second minimum circuit, receiving the second reference voltage and the adaptive reference voltage, and outputting a second minimum of the second reference voltage and the second adaptive reference voltage; and
- a comparator, configured to compare the first minimum and the second minimum to output the gating signal.

28. The gating-based receiver circuit according to claim 27, wherein in response to both the first input signal and the second input signal are higher than the adaptive reference voltage and the second reference voltage, the gating signal is a disabling signal, and in response to one of the first input signal and the second input signal is lower than the adaptive reference voltage and the second reference voltage, the gating signal is an enabling signal.

29. The gating signal generator according to claim 25, wherein the adaptive reference voltage is lower than a highest voltage of the first input signal and the second input signal, and higher than a lowest voltage of the second reference voltage.

30. The gating signal generator according to claim 17, wherein the gating signal is provided to a receiver of a memory device, wherein the receiver is enabled or disabled by the gating signal to transmit or not to transmit the first input signal and the second input signal.

31. The gating signal generator according to claim 30, wherein the first input signal and the second input signal are a pair of differential data strobe signals.

32. The gating signal generator according to claim 30, wherein the memory device is DRAM.

* * * * *